(12) United States Patent
Ofir

(10) Patent No.: US 12,511,850 B2
(45) Date of Patent: Dec. 30, 2025

(54) UPCONVERSION-BASED PHOTOCHROMIC DIMMING IN WAVEGUIDE DISPLAYS

(71) Applicant: Adeia Guides Inc., San Jose, CA (US)

(72) Inventor: Yuval Ofir, Kfar Ha-Oranim (IL)

(73) Assignee: Adeia Guides Inc., San Jose, CA (US)

( * ) Notice: Subject to any disclaimer, the term of this patent is extended or adjusted under 35 U.S.C. 154(b) by 175 days.

(21) Appl. No.: 18/204,053

(22) Filed: May 31, 2023

(65) Prior Publication Data

US 2024/0404223 A1 Dec. 5, 2024

(51) Int. Cl.
| | |
|---|---|
| *G06T 19/20* | (2011.01) |
| *G06F 3/01* | (2006.01) |
| *G06T 19/00* | (2011.01) |
| *G06V 10/143* | (2022.01) |
| *G06V 10/56* | (2022.01) |
| *G06V 10/60* | (2022.01) |
| *G09G 5/377* | (2006.01) |

(52) U.S. Cl.
CPC ............... *G06T 19/20* (2013.01); *G06F 3/013* (2013.01); *G06T 19/006* (2013.01); *G06V 10/143* (2022.01); *G06V 10/56* (2022.01); *G06V 10/60* (2022.01); *G09G 5/377* (2013.01); *G06T 2219/2012* (2013.01); *G09G 2320/0626* (2013.01)

(58) Field of Classification Search
CPC ..................................................... G06T 19/20
See application file for complete search history.

(56) References Cited

U.S. PATENT DOCUMENTS

| | | | |
|---|---|---|---|
| 8,619,005 B2 | 12/2013 | Cok et al. | |
| 10,867,451 B2 | 12/2020 | Sears et al. | |
| 2014/0124715 A1 | 5/2014 | Ofir et al. | |
| 2016/0055822 A1 | 2/2016 | Bell | |
| 2016/0223878 A1* | 8/2016 | Tran | G02F 1/1533 |
| 2017/0090194 A1 | 3/2017 | Hayes | |
| 2018/0348522 A1 | 12/2018 | Young et al. | |
| 2019/0324274 A1 | 10/2019 | Kalinowski et al. | |
| 2020/0018963 A1 | 1/2020 | Osterhout | |
| 2020/0111259 A1* | 4/2020 | Sears | G02B 27/0172 |

(Continued)

OTHER PUBLICATIONS

"Magic Leap 2: Video shows dimming feature in action," [retrieved from URL: https://mixed-news.com/en/magic-leap-2-video-shows-dimming-feature-in-action/] (6 pages).

(Continued)

*Primary Examiner* — Shivang I Patel
(74) *Attorney, Agent, or Firm* — HALEY GUILIANO LLP

(57) ABSTRACT

Systems, methods and apparatuses are described for dimming one or more portions of an extended reality (XR) display. Control circuitry may be configured to generate for display, at the display, an XR object. A dimmable optical element may comprise a plurality of up-converting nanoparticles and a photochromic material, and is configured to cause a change in color of at least a portion of the display. The dimmable optical element may be irradiated with light of a first energy level which causes the plurality of upconverting nanoparticles to emit light of a second energy level higher than the first energy level. The photochromic material may absorb the light of the second energy level to cause the change in color of the at least a portion of the display.

22 Claims, 9 Drawing Sheets

(56) References Cited

U.S. PATENT DOCUMENTS

2022/0214546 A1    7/2022  Marconcini
2023/0125258 A1*   4/2023  Connor .................... G02F 1/19
                                                           359/263

OTHER PUBLICATIONS

Guttag, K. "Magic Leap 2 (Pt. 3): Soft Edge Occlusion, a Solution for Investors and Not Users," [retrieved from https://kguttag.com/2021/10/28/magic-leap-2-pt-3-soft-edge-occlusion-a-solution-for-investors-and-not-users/] (2021) (23 pages).

* cited by examiner

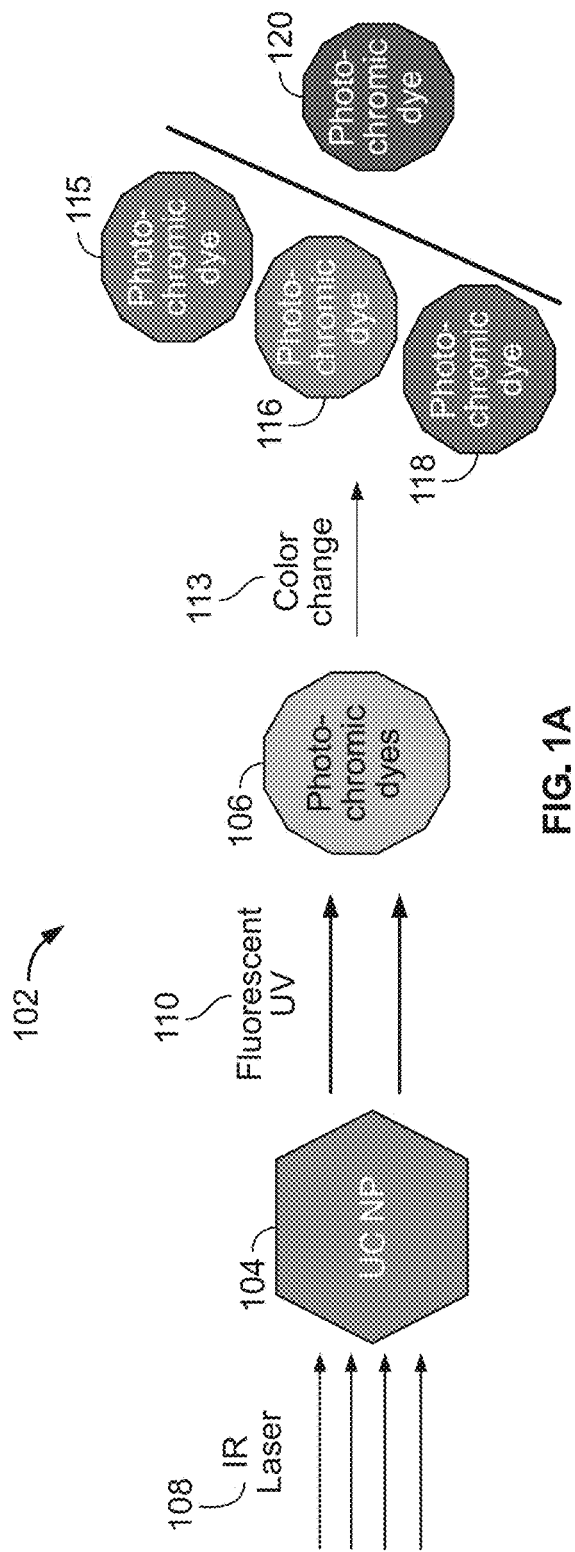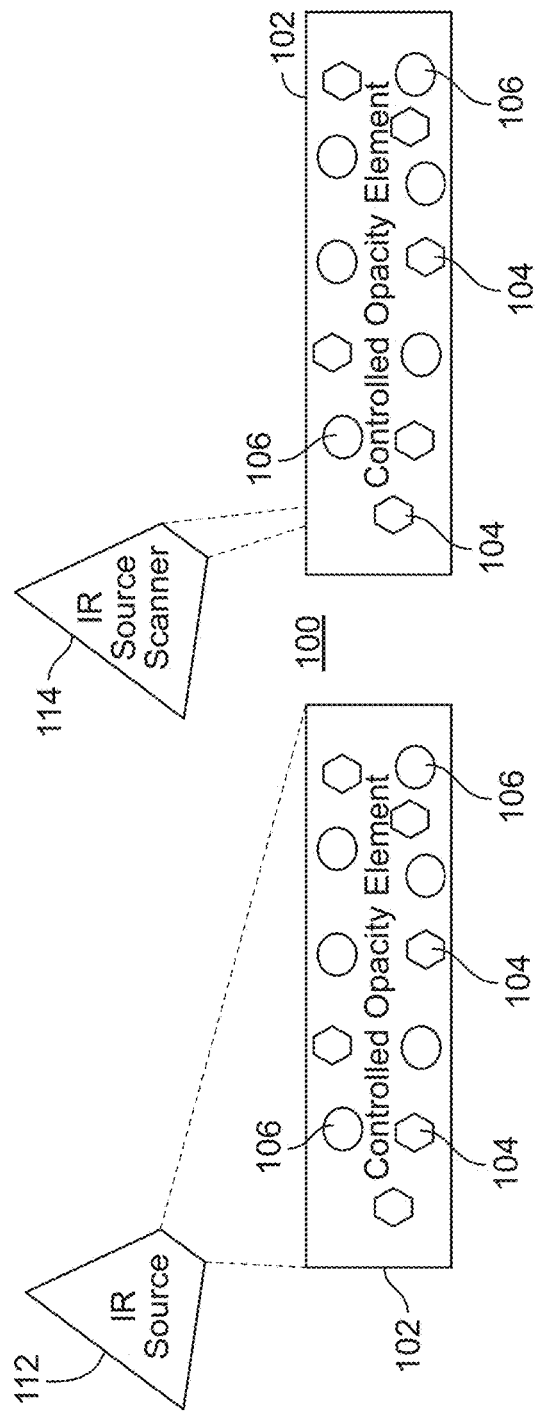

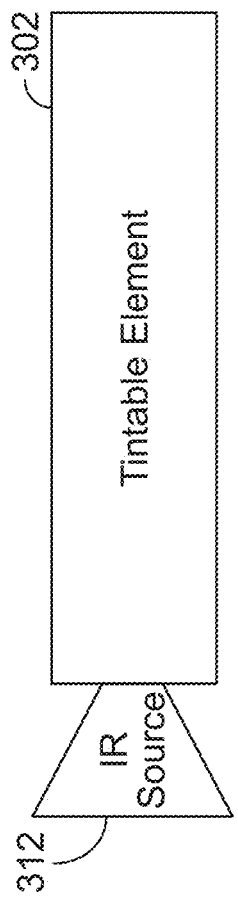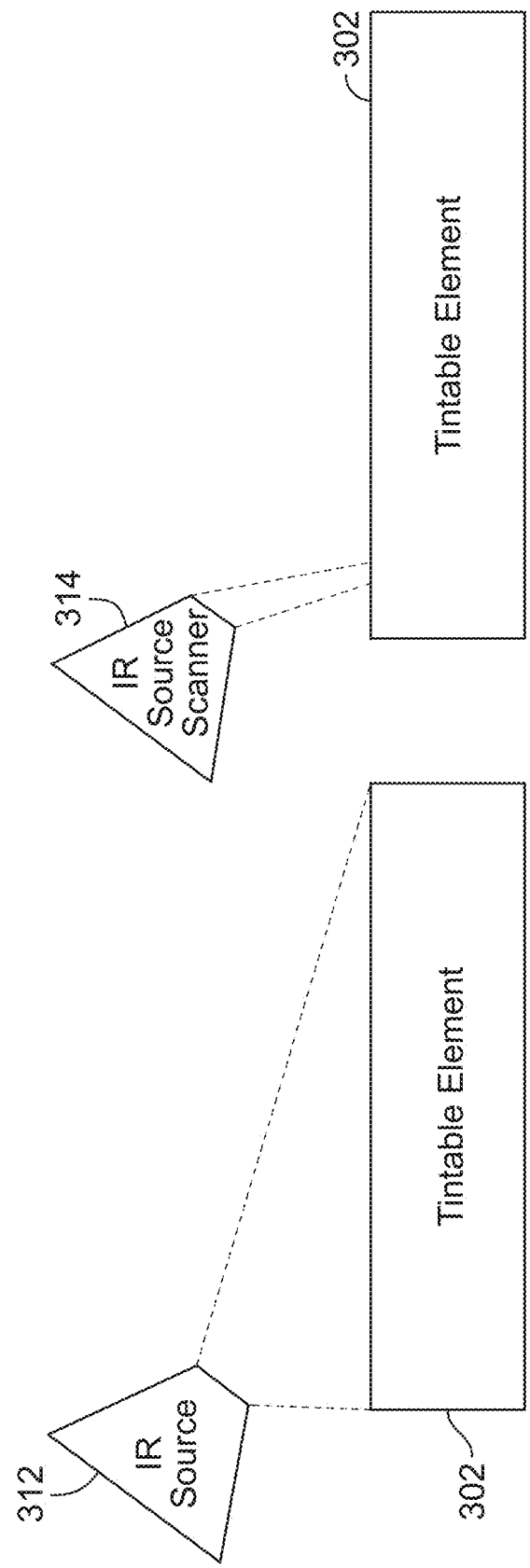

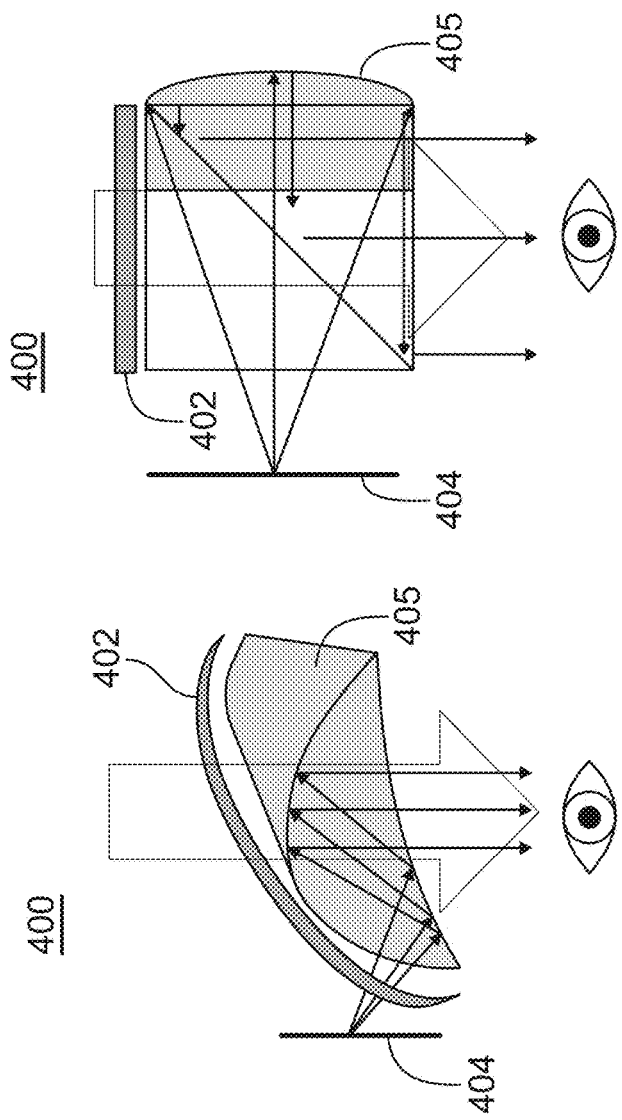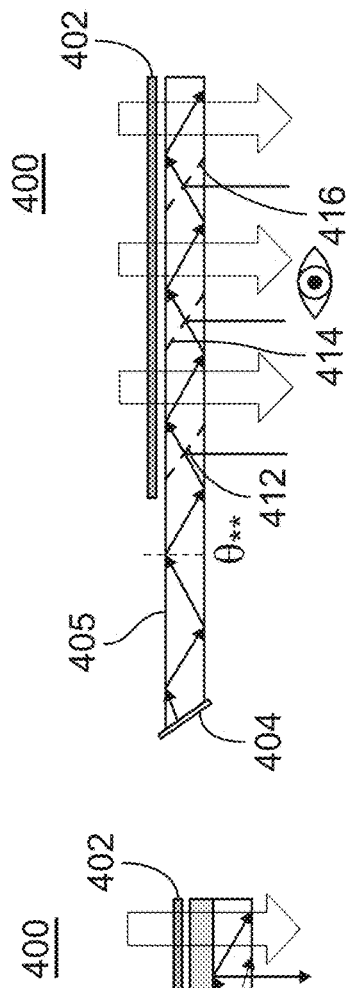

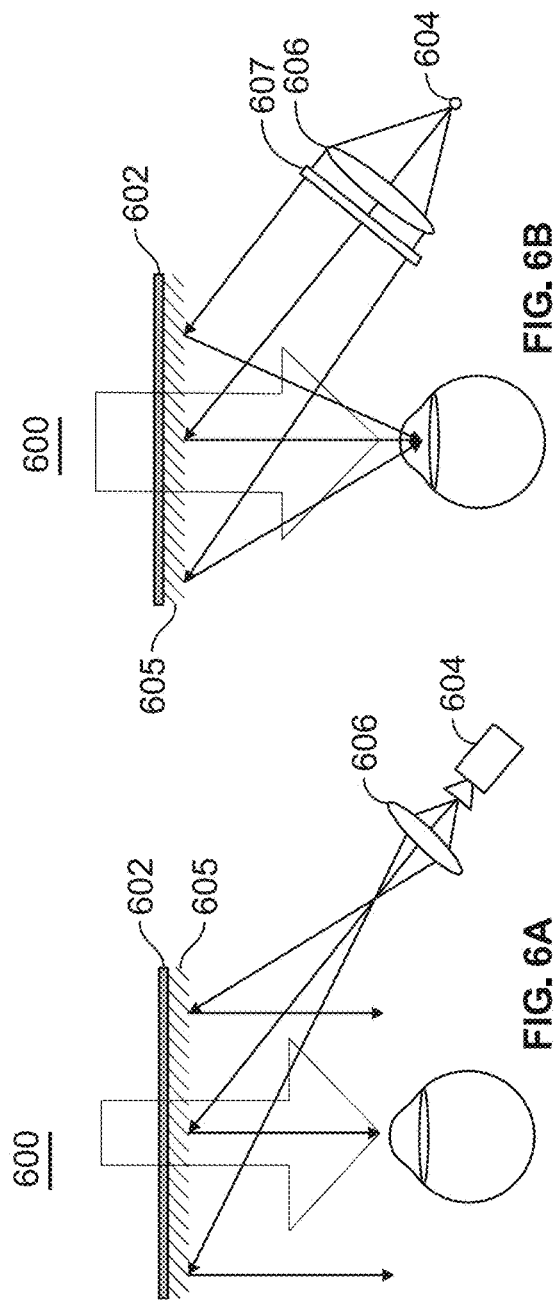
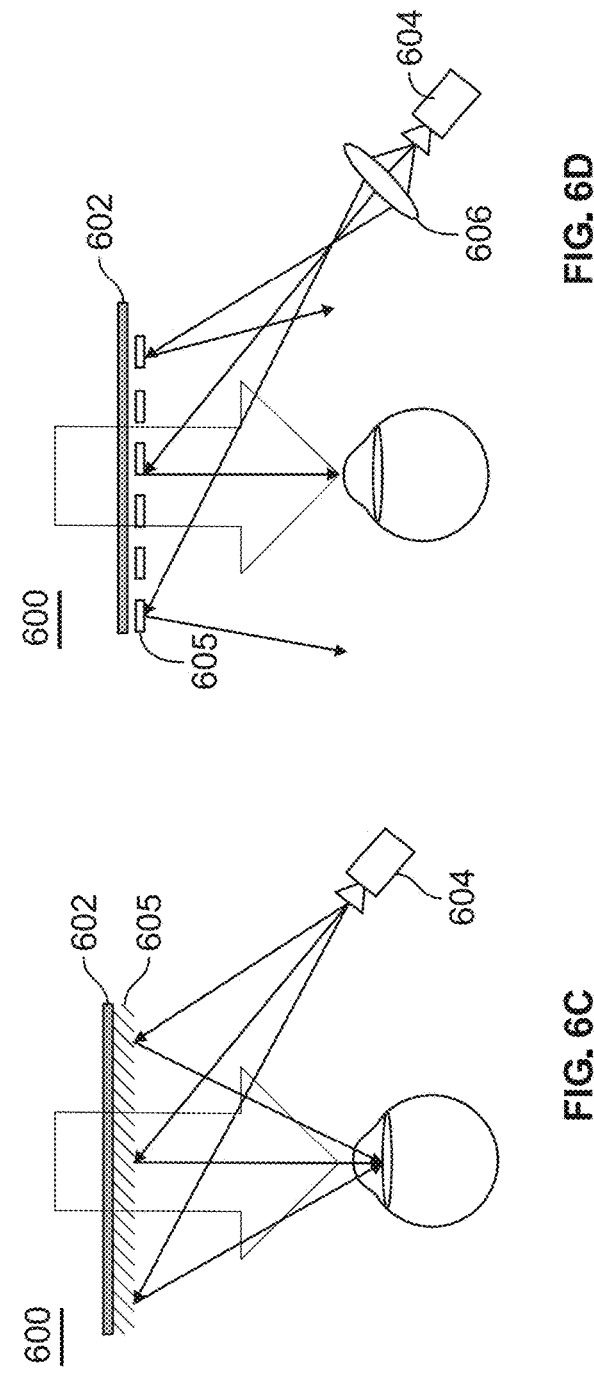

UPCONVERSION-BASED PHOTOCHROMIC DIMMING IN WAVEGUIDE DISPLAYS

FIELD OF DISCLOSURE

This disclosure is directed to apparatuses, methods and systems for selectively dimming one or more portions of an extended reality (XR) display.

BACKGROUND

Rapid advances in optical elements, display technologies, and digital processing have resulted in virtual reality (VR) and augmented reality (AR) technologies that are revolutionizing the ways that users perceive and interact with various types of digital information. A large focus of modern technology is to create head-mounted displays (HMDs) or near-eye displays (NEDs) that create virtual images in a field-of view of one or two eyes of a user. NEDs for experiencing VR and AR have attracted significant attention and efforts due to their ability to reconstruct interactions between computer-generated images and the real world. AR and VR displays face several common challenges to satisfy demanding human vision requirements, such as brightness, field of view (FOV), eye motion box (EMB), angular resolution, dynamic range, correct depth cue, etc. These requirements often exhibit tradeoffs with one another.

AR enables a practice in which a wearer of AR glasses can view a digital image overlayed on top of the surrounding environment. However, the brightness of the surrounding environment may be constantly changing based on location (such as inside or outside a house), hour or time of the day, weather, shaded or exposed areas, color of background, etc. On the other hand, current AR displays are limited in their brightness, mostly due to overall low optical efficiency. As such, the digital images projected during a bright and sunny day have low contrast in relation to the ambient environment or alternatively, are too bright when viewed in a dark room or at night.

In one approach, a tinted sunglass-like lens or tinted visor-like lens is added as an outer layer of an optical system, which increases the contrast of the digital image in relation to the brightness of the AR environment. However, such an approach is fixed and permanent, creating a problem if the AR device is used in less bright environments, such as inside a house or a facility. In another approach, the display brightness setting of an AR device can be increased, but such an approach may lead to quickly draining the battery life of the AR device and/or overheating of the AR device. In another approach, a pixelated liquid crystal display/shutter on the front of AR glasses is used to dim ambient light to perform soft edge occlusion. However, such an approach may be complicated and/or expensive to fabricate, requiring at least two transparent electrodes, and conduction lines for each pixel, to adjust brightness levels thereof. Moreover, in such an approach, either the entire AR environment is dimmed, or an overly large portion of the AR environment is dimmed. Accordingly, there is a need for more effective mechanisms to dim one or more portions of a relatively high brightness extended reality (XR) environment in a dynamic manner.

SUMMARY

To help address these issues, the present disclosure provides for various systems, apparatuses, and methods. In one example, a device comprises a display; control circuitry configured to control the display to generate an XR object; and a dimmable optical element. In this example, the dimmable optical element comprises a plurality of up-converting nanoparticles and a photochromic material, and is configured to cause a change in color of at least a portion of the display. The control circuitry is configured to cause the dimmable optical element to be irradiated with light of a first energy level which causes the plurality of upconverting nanoparticles to emit light of a second energy level higher than the first energy level, and the photochromic material absorbs the light of the second energy level to cause the change in color of the at least a portion of the display.

Such aspects may leverage a unique combination of materials forming the dimmable optical element to dynamically dim or tint an XR display as a whole or locally. For example, the dimmable optical element can be configured to cause dimming of an entirety of the XR display or selected portions thereof, e.g., tinting at the local or pixel level. Such dimmable element may be dimmable or tintable by both external light (e.g., external UV light, such as sunlight) or on-demand light (e.g., IR laser light generated by the XR device or other device), and may be employed in a variety of different XR displays that include, for example, one or more of reflective waveguides, diffractive waveguides (e.g., surface relief gratings), volume Bragg gratings, or holographic optical elements, and which may be flat or curved, and/or glass or plastic, for instance. Moreover, the dimmable optical element can be shielded from the outside environment by being buried internally to an XR device to help lengthen its lifespan.

In some embodiments, the light of the first energy level is infrared light, and the light of the second energy level is ultraviolet fluorescent light.

In some embodiments, the infrared light is received from a source that is external to the XR device.

In some embodiments, the XR device further comprises an infrared light source, and the control circuitry is further configured to determine that the at least a portion of the display should be dimmed, based on comparing a current brightness value of the at least a portion of the display to a threshold value; and in response to determining that the at least a portion of the display should be dimmed, cause the at least a portion of the display to be dimmed by causing the infrared light source to irradiate the infrared light.

In some embodiments, the at least a portion of the display corresponds to an entirety of the display, and the control circuitry is further configured to cause the infrared light source to irradiate the entirety of the display with the infrared light.

In some embodiments, the XR device further comprises a scanner that is coupled to the infrared light source to form an infrared light scanner, and the display comprises a plurality of portions, where the at least a portion of the display corresponds to a subset of the plurality of portions of the display. The control circuitry may be further configured to cause the infrared light scanner to irradiate the subset of the plurality of portions of the display, e.g., to allow for local/pixelated dimming, based on the scanning of the IR light source.

In some embodiments, the control circuitry may be configured to track eye movement of one or both eyes of a user associated with the XR display, and cause an infrared light source (e.g., an infrared light scanner) to irradiate the subset of the plurality of portions of the display based at least in part on tracking the eye movement of the user.

In some embodiments, the XR device further comprises an image sensor configured to capture an image of the display, and the control circuitry is configured to determine that at least a portion of the display should be dimmed by analyzing the image to determine a current brightness value of the at least a portion of the display; comparing the brightness value to a threshold value; and based on the comparison, determining that at the least a portion of the display should be dimmed.

In some embodiments, the XR device is an augmented reality (AR) device; the XR object is an AR object overlaid on a real-world scene; and the at least a portion of the display corresponds to a portion of the real-world scene.

In some embodiments, the photochromic material corresponds to a photochromic dye.

In some embodiments, the dimmable optical element is disposed internal to the XR device, and the XR device comprises a substrate (e.g., glass and/or any other suitable material) that blocks at least a portion of ultraviolet light from an environment external to the XR device from reaching the dimmable optical element.

BRIEF DESCRIPTION OF THE DRAWINGS

The present disclosure, in accordance with one or more various embodiments, is described in detail with reference to the following figures. The drawings are provided for the purpose of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

FIGS. 1A-1C depict illustrative devices for dimming at least a portion of a display of an extended reality (XR) device, in accordance with some embodiments of this disclosure.

FIGS. 3A-3C show various configurations of an IR source and a dimmable optical element, in accordance with some embodiments of this disclosure.

FIGS. 4A-4G show illustrative arrangements for components of an XR device, in accordance with some embodiments of this disclosure.

FIGS. 6A-6D show illustrative arrangements for components of an XR device, in accordance with some embodiments of this disclosure.

DETAILED DESCRIPTION

Figure 2A:
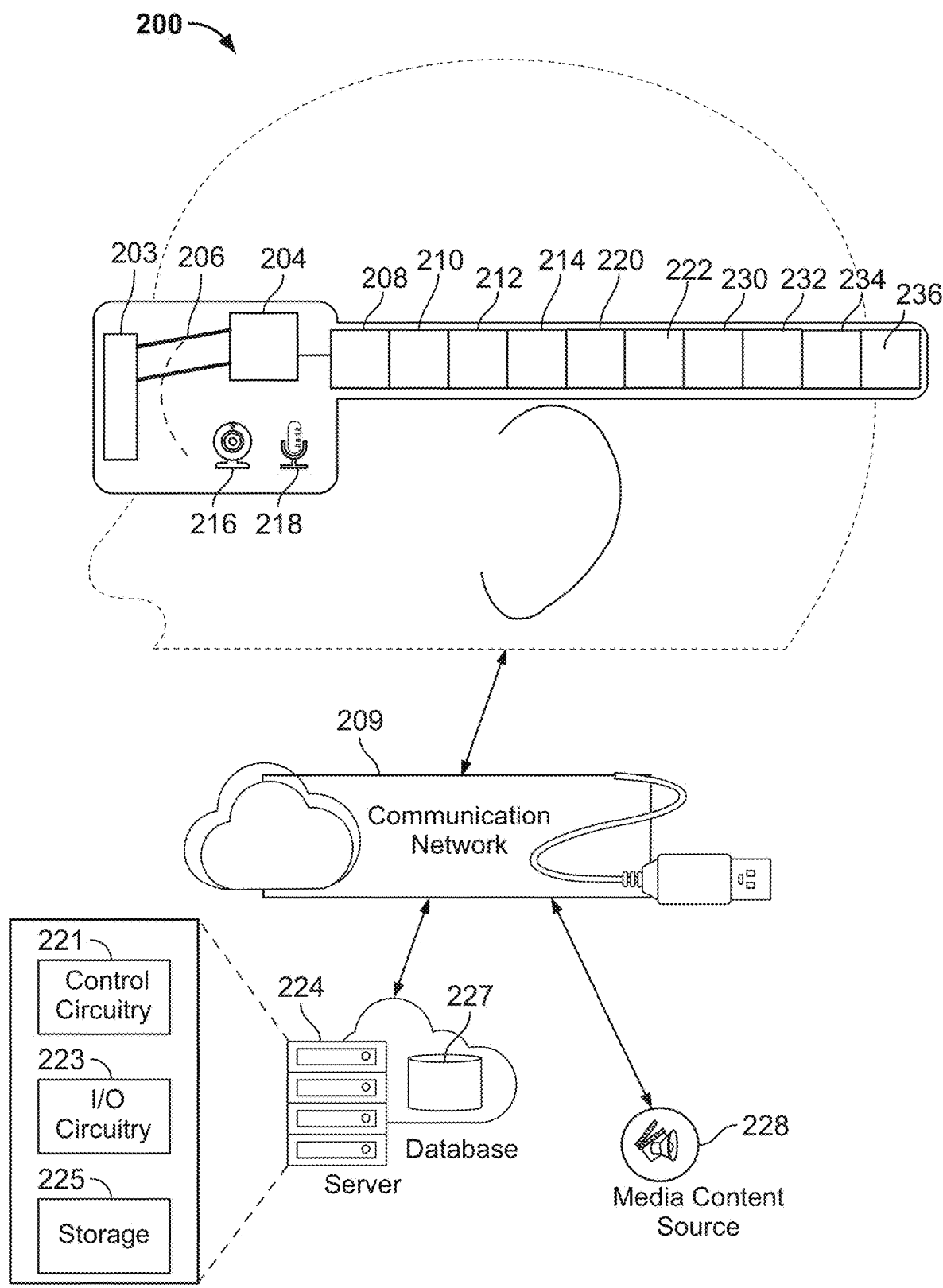
FIGS. 2A-2B depict an example of an XR device and a system, in accordance with some embodiments of this disclosure.

FIGS. 1A-1C depict illustrative devices for dimming at least a portion of a display of an extended reality (XR) device, in accordance with some embodiments of this disclosure. As described herein, XR may be understood as virtual reality (VR), augmented reality (AR), or mixed reality (MR) or any combination thereof. VR systems may fully immerse (e.g., giving the user a sense of being in an environment) or partially immerse (e.g., giving the user the sense of looking at an environment) users in a three-dimensional (3D), computer-generated environment. AR systems may provide a modified version of reality, such as enhanced information overlaid over real-world objects. MR systems map interactive virtual objects to the real world. XR device 100 may be smart glasses, a stereoscopic display, XR glasses, XR goggles, an XR head-mounted display (HMD), a near-eye display device, a smartphone, a tablet, a television, a personal computer, a heads-up display (such as in a vehicle), or any other suitable computing device, or any combination thereof.

XR device 100 may comprise a dimmable optical element (or controlled opacity element) 102, which may comprise a plurality of upconverting nanoparticles (UCNPs) 104 (represented by hexagons in FIGS. 1A-1C) and a photochromic material 106 (represented by circles or dodecagons in FIGS. 1A-1C). Photochromic material 106 may comprise a plurality of photochromic dyes and/or photochromic layers. In some embodiments, dimmable optical element 102 may correspond to an optical filter element.

UCNPs 104 may correspond to one or more nanomaterials included in a class of optical nanomaterials that absorb photons of relatively lower energy (e.g., infrared (IR) light, or any other suitable light or electromagnetic energy, or any combination thereof) and convert and emit such photons as photon(s) of relatively higher energy (e.g., ultraviolet (UV) light, or visible light, or any other suitable light or electromagnetic energy, or any combination thereof). For example, two photons of relatively longer wavelengths (e.g., IR light) may be converted (e.g., combined) into a higher energy photon of a shorter wavelength (e.g., UV light). UCNPs 104 may comprise, for example, compositions of NaYF4:Yb/Er and NaYF4:Yb/Tm; one or more rare-earth elements (e.g., Y, Sc, and the lanthanides), e.g., $Er^{3+}$, $Tm^{3+}$, and $Ho^{3+}$ ions; synthesis of core/shell nanoparticles; or any other suitable materials; or any combination thereof. In some embodiments, UCNPs 104 may be doped with dye sensitizers, or any other suitable materials, or any combination thereof, to facilitate triplet-triplet annihilation (TTA). In some embodiments, UCNPs 104 may be doped with lanthanide ions featuring a wealth of electronic transitions within the 4f electron shells and UCNPs 104 may up-convert two or more lower-energy photons (of IR) into one high-energy photon. In some embodiments, a particle size, composition, surface arrangement, or any other suitable parameter, or any combination thereof, may be suitably tuned to generate the fluorescence in the UV light 110. In some embodiments, photochromic material 106 may comprise a single dye, or a mixture of dyes, e.g., red, green, blue (RGB) dyes 115, 116, 118, respectively, or may comprise a neutral density element 120 (e.g., a gray color or black color), or any other suitable dye or other material, or any combination thereof.

Photochromic material 106 may correspond to material that, when light of certain wavelengths is applied thereto, changes from a transparent to a colored state, and may again become transparent when the light is dimmed. In some embodiments, photochromic material 106, the color change of which may be triggered by exposure to UV or short visible light. In some embodiments, photochromic material 106 may comprise organic material, e.g., triarylmethanes, stilbenes, azastilbenes, nitrones, fulgides, spiropyrans, naphthopyrans, spirooxazines, quinones, sodium nitroprussides, ruthenium sulfoxide complexes, or any other suitable photochromic material, or any combination thereof.

Additionally, or alternatively, photochromic material 106 may comprise inorganic material, e.g., titanium oxide, zinc oxide, tungsten oxide, nickel oxide, $FeTiO_3$, $CdFe_2O_4$, YFeO$_3$, SrTiO$_3$, CdO, V$_2$O$_5$, Bi$_2$O3, PbO, Ta2O5, Nb$_2$O$_5$, SnO$_2$, ZrO$_2$, CeO$_2$, oxygen comprising hydrides (e.g., oxygen comprising yttrium hydrides (e.g. YHxOY)), mixed oxides (e.g., lead titanate), lead-lanthanum titanate, oxides comprising metallic or polymeric inclusions, zinc sulfide, lead sulfide, cadmium sulfide, other metal sulfides, oxide/sulfide composites, selenides (e.g., ZnSe, ZrSe2, HfSe2 and InSe), metallic or other dopants in any such compounds, compound semiconductors (e.g., GaP), semiconductors of other compositions (e.g., doped silicon or germanium doped silicon carbide, photoconducting polymers and/or semiconducting polymers (e.g., polyvinyl carbazoles, polythiophenes, polyphenylene vinylenes, polyphenylenes and polyanilines), or any other suitable material, or any combination thereof.

In some embodiments, UCNPs 104 and photochromic material 106 may be incorporated into resin (or any other suitable material) of dimmable optical element 102, or as a coating thereon. In some embodiments, the layer of photochromic material 106 may comprise a composite of any suitable number of materials, where one or more of the materials may be (homogeneously or heterogeneously) dispersed in the coating matrix or may comprise sequentially deposited layers. Photochromic material 106 may be formed using any suitable technique, e.g., wet chemical methods, such as, for example, by spin coating, roller coating, dip coating, or spray coating and the like, or by incorporation into the resin.

XR device 100 may comprise an infrared (IR) light source (e.g., IR laser 108 and/or IR source 112 and/or IR source scanner 114)) configured to irradiate UCNPs 104 with IR light. In some embodiments, such irradiation may occur based on light received from a source internal to XR device 100 (e.g., using local generation of UV light, such as when the XR device is being used inside a house, building and/or in a relatively darker or shaded environment) and/or a source external to XR device 100 (e.g., the sun or other source or device external to XR device 100, such as when XR device is being used outside a building and/or a bright environment).

When irradiated with IR light of a relatively lower energy level, UCNPs 104 may be configured to emit fluorescent UV light 110 of a relatively higher energy level. Photochromic material 106 may be configured to absorb such fluorescent UV light 110, and absorption of such relatively high energy fluorescent UV light 110 may activate photochromic material 106 to cause a color change 113 in photochromic material 106, which in turn may cause one or more portions of a display of XR device 100 to be dimmed or tinted. For example, the dimming or tinting of dimmable optical element 102 may cause dimming or tinting of one or more portions of the display of XR device 100 by tinting, dimming or blocking light from an external environment surrounding XR device 100 before such light can impinge on, or interfere with, one or more portions of the display of the XR device and/or the image being provided via the display of the XR device. Such features may enable an adequate contrast between an XR object (e.g., computer-generated imagery, such as, for example, an virtual object overlaid or superimposed on a real-world environment in an AR environment, or a virtual object in a VR environment) and other portion(s) of the environment (e.g., portions of the real-world environment experiencing high brightness) being presented via XR device 100, e.g., by dimming portions of the displayed real-world environment surrounding the XR object or other portions of the real-world environment, and/or any other suitable portion of content, provided to the eyes of the user of XR device 100.

In some embodiments, specific portions of dimmable element 102 (e.g., UCNPs 104 and/or photochromic material 106) may be placed within XR device 100 at positions that enable the dimming of external light at specific portions (or pixels) of a display (e.g., pixels of one or more projectors and/or micro-displays) of XR device 100, to enable targeted control and dimming of specific portions of the display. For example, IR source scanner 114 may be caused to scan specific portions of dimmable optical element 102 with a laser of IR source scanner 114, where such specific portions of dimmable optical element 102 may correspond to one or more specific pixels or portions of content being presented on XR device 100 having a relatively low contrast ratio (below a threshold) value or relatively high brightness value to dim, tint or darken such one or more pixels or portions. A specific position of a display of XR device 100 may be determined to be relatively bright (e.g., based on comparison to a threshold) due to the sun's rays hitting such position of the display, and thus a candidate for dimming to block ambient light at particular portions of the XR display. In some embodiments, IR source 112 may be caused to irradiate an entire surface of dimmable optical element 102, to dim, tint or darken an entirety of content (or a substantially an entirety of content or a majority of content) being presented on XR device 100, e.g., having a relatively low contrast ratio (below a threshold) value or relatively high brightness value (above a threshold value), which may correspond to a flood exposure of light.

Figure 2B:
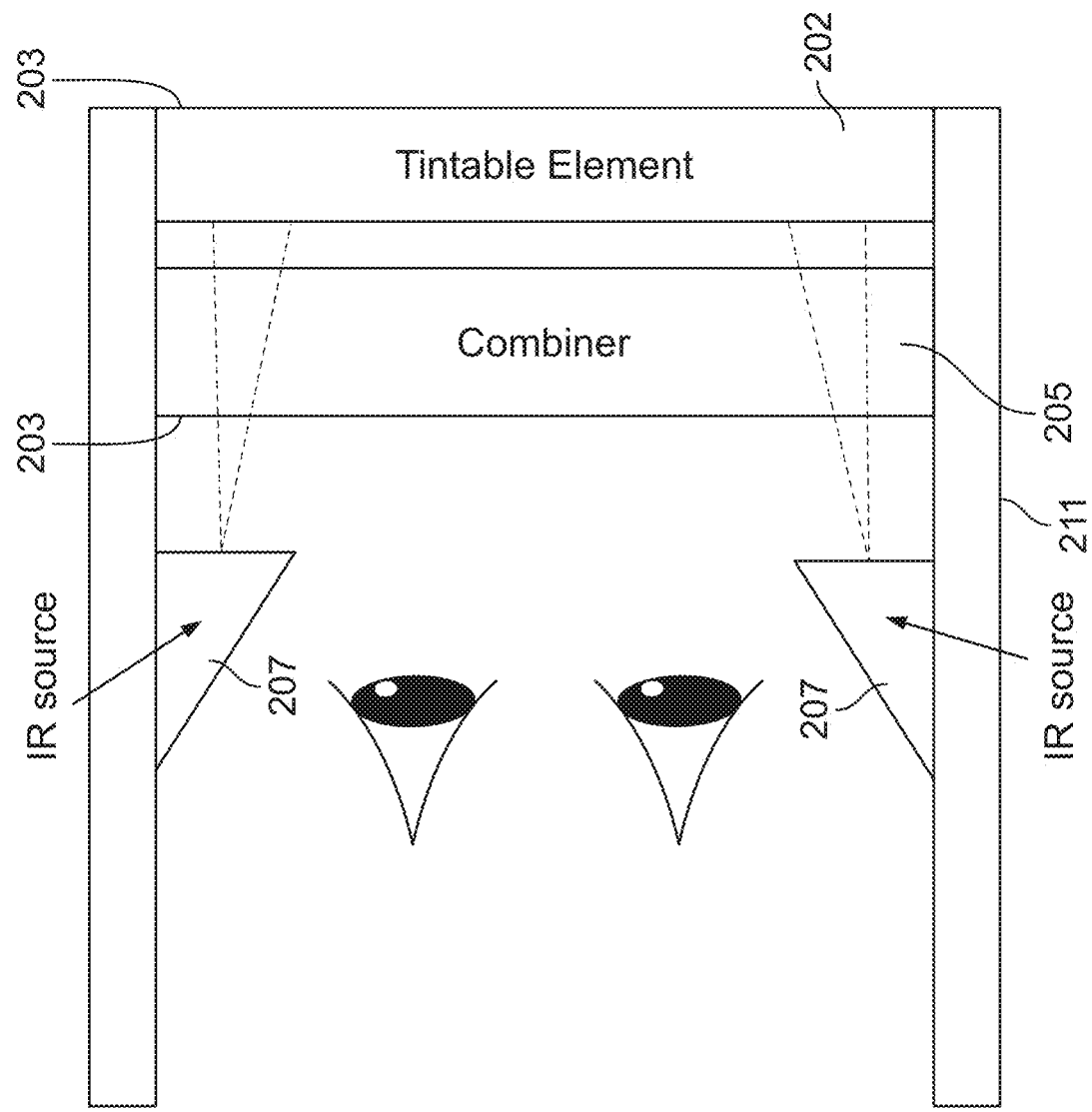

FIGS. 2A-2B depict an example of XR device 200 and a system, in accordance with some embodiments of this disclosure. In some embodiments, XR device 100 of FIGS. 1A-1C may correspond to XR device 200 of FIGS. 2A-2B, which may be an HMD, or any other suitable XR device, or any combination thereof. XR device 200 may correspond to optical equipment. XR device 200 may be smart glasses, a stereoscopic display, XR glasses, XR goggles, an XR head-mounted display (HMD), a near-eye display device, a smartphone, a tablet, a personal computer, a television, a heads-up display, or any other suitable computing device, or any combination thereof.

XR device 200 may comprise optical element 203, image source 204, control circuitry 208, memory 210, input/output (I/O) circuitry 212, and power source 214. As shown in FIG. 2B, optical element 203 may comprise tintable element 202 (which may correspond to dimmable optical element 102 of FIGS. 1A-1C), combiner 205, and/or a lens, and/or any other suitable optical components. In some embodiments, each of tintable element 202 and combiner 205 may be positioned in front of an eye of a user, e.g., in between the user and an external environment.

Image source 204, which provides an image beam 206 to optical element 202, may comprise a device configured to project, to optical element 202, image beam 206 comprising beams of light corresponding to a plurality of pixels or voxels that are to be displayed as an image, to generate an XR viewing environment in which a user may be fully or partially immersed. Image source 204 may comprise or correspond to any suitable type and/or number of devices, e.g., one or more projectors and/or micro-displays comprising micro-light emitting diodes (LEDs), organic LEDs (OLEDs), liquid crystal on silicon (LCoS) and/or any other electronic components or displays. As referred to herein, the display of XR device 200 may be understood as comprising one or more of image source 204, combiner 205, content being generated for display to a user of XR device 200, and/or one or more waveguides, any other suitable optical elements, mirrors, and/or any other suitable components, or any combination thereof. In some embodiments, a view or perspective of the user of the XR environment may change as the user moves his or her head, and other features (e.g., audio) may be suitably modified. Content provided by XR device 200 may be for entertainment purposes (e.g., video games, movies, videos, sports), communication (e.g., social media), educational purposes (e.g., a virtual classroom), professional purposes (e.g., training simulations), medical purposes, or any other suitable purpose, or any combination thereof.

Combiner 205 may enable a user to see imagery of the real world with AR objects overlaid thereon. In some embodiments, combiner 205 may correspond to or comprise a reflective waveguide, a diffractive waveguide (e.g., surface relief gratings, volume Bragg gratings, holographic optical elements), flat glass or plastic, or curved glass or plastic, or any other suitable waveguide or material, or any combination thereof that diffracts light from an image source to an eye of the user, e.g., implemented in a lens of XR device 200. In some embodiments, the waveguide of XR device 200 may correspond to one or more of the waveguides discussed in commonly owned application Ser. No. 17/702,507 filed Mar. 23, 2022; application Ser. No. 17/744,936 filed May 16, 2022; application Ser. No. 17/825,486 filed May 26, 2022; application Ser. No. 17/979,923 filed Nov. 3, 2022; application Ser. No. 18/121,045 filed Mar. 14, 2023; and application Ser. No. 18/121,043 filed Mar. 14, 2023, the contents of each of which are hereby incorporated by reference herein in their entireties. Combiner 205 may be configured to transmit to a user an XR scene (e.g., a VR scene or an AR scene comprising one or more AR objects overlaid on a real-world view), based on image beam 206 from image source 204 or external light from an environment surrounding the XR device, or from any other suitable source, or any suitable combination thereof.

In some embodiments, IR source 207 of FIG. 2B may be used to provide IR light to tintable element 202, which may convert such IR light to UV fluorescence light, which may be used to activate (e.g., tint or dim one or more portions of) photochromic material 106, which in turn cause the change in color (e.g., tint or dim) of the at least a portion of the display. IR source 207 may be disposed at any suitable position within or on XR device 200. IR source 207 may correspond to IR source 112 or IR source scanner 114 of FIGS. 1A-1C (and/or IR source 312 or IR source 314 of FIGS. 3A-3C).

As shown in FIG. 2B, dimmable optical element 202 may be caused to darken based on being exposed to external UV from sunlight and/or by exposing dimmable optical element 202 to IR light and/or from another suitable source, which causes photochromic material 106 (FIGS. 1A-1C) to change its color or enter a colored state, resulting in a colored dimmable optical element 202 which effectively tints ambient light (e.g., in an environment surrounding XR device 200) at this specific color.

Control circuitry 208 may comprise any suitable processing circuitry, e.g., one or more microprocessors, microcontrollers, digital signal processors, programmable logic devices, field-programmable gate arrays (FPGAs), application-specific integrated circuits (ASICs), or any other suitable circuitry, or any combination thereof, and may include a multi-core processor (e.g., quad-core). Control circuitry 208 may be configured to generate one or more images for display through combiner 205 and instruct image source 204 to produce one or more image beams corresponding to the one or more images. Memory 210 may be any device for storing electronic data, such as a random-access memory, a solid-state device, a quantum storage device, a hard disk drive, a non-volatile memory or any other suitable fixed or removable storage device, and/or any combination of the same. Memory 210 may store data defining images for display by XR device 200.

In some embodiments, control circuitry 208 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 208 executes instructions (for dimming one or more portions of an XR display) stored in a non-transitory computer readable medium (e.g., memory 210 or storage 225). Specifically, control circuitry 208 may be instructed by to perform the functions discussed above and below. Control circuitry 208 may allow a user to provide user profile information or may automatically compile user profile information. For example, control circuitry 804 may access and monitor network data, video data, audio data, processing data, participation data from a user. Control circuitry 208 may obtain all or part of other user profiles that are related to a particular user (e.g., via social media networks), and/or obtain information about the user from other sources that control circuitry 208 may access. As a result, a user can be provided with a unified experience across the user's different devices.

I/O circuitry 212 may comprise circuitry (e.g., a network adaptor, I/O paths, or any other suitable circuitry, or any combination thereof) that connects the HMD to one or more other devices (e.g., XR devices and/or XR content sources, such as, for example, server 224 and/or media content source 228) over a network (e.g., communication network 209) to request and receive content (e.g., XR content) and/or other data. I/O circuitry 212 may comprise wires and/or busses connected to a physical network port, e.g. an ethernet port, a wireless Wi-Fi port, a cellular communication port, or any other type of suitable physical port. I/O circuitry 212 may provide content (e.g., XR content, broadcast programming, on-demand programming, Internet content, content available over a local area network (LAN) or wide area network (WAN), and/or other content) and data to control circuitry 208, which may comprise processing circuitry and storage. Control circuitry 208 may be used to send and receive commands, requests, and other suitable data using I/O circuitry 212 to one or more communications paths. Power source 214 comprises a source of power to the image source 204, control circuitry 208, memory 210, and/or I/O circuitry 212, such as a battery, solar generator, or wired power source or any other suitable source, or any combination thereof.

Communication network 209 may be one or more networks including the Internet, a mobile phone network, mobile, voice or data network (e.g., a 5G, 4G, or LTE network), cable network, public switched telephone network, or other types of communication network or combinations of communication networks. Server 224 may include control circuitry 221 and storage 225 (e.g., RAM, ROM, Hard Disk, Removable Disk, etc.). Storage 224 may store one or more databases 227. Server 224 may also include an I/O circuitry 223. In some embodiments, control circuitry 221 may be similar to control circuitry 208, and storage 224 may be similar to memory 210, except control circuitry 221 may be configured to have more processing power and storage 224 may be configured to have a greater amount of storage. In some embodiments, control circuitry 221 and storage 224 may be distributed across any suitable number of servers 224, e.g., in a cloud environment.

In some embodiments, XR device 200 may comprise sensors at any suitable portion of XR device 200, such as, for example, one or more image sensors 216, one or more microphones 218, one or more brightness or ambient light sensors 220, one or more illuminance sensors 222, one or more accelerometers (and/or one or more gyrometers and/or one or more magnetometers) 230, one or more speakers 232, one or more depth sensors 234, one or more GPS modules 236 (e.g., in communication with one or more servers and/or cell towers and/or satellites) to ascertain a location of the XR device, or any other suitable sensor(s), or any combination thereof.

In some embodiments, control circuitry 208 of XR device 200 (and/or control circuitry 221 of server 224) may determine, based on data received from image sensor 216, that one or more portions of a display of XR device 200 should be dimmed based on analyzing an image of content being provided to a user via XR device 200 (and/or by analyzing real-world surroundings of a user of XR device 200). The control circuitry may determine one or more portions (e.g., pixels being displayed via XR device 200 to a user) having a brightness above a particular threshold value, to allow for specific dimming of a particular pixel or portion of the display or an entirety of the display. Illuminance associated with portions of the XR display providing content to a user, e.g., the amount of light (lux) falling on a surface (over any given square foot or square meter), may be measured using a photoresistor, photodiode, photodiode, or using any other suitable sensor, or any combination thereof, by converting the magnitude of light into an electrical signal, and may be compared by the control circuitry to a threshold value, to determine whether a particular portion of the XR display should be dimmed. In some embodiments, each region or particular portion of the XR display may be associated with a respective illuminance sensor 222.

In some embodiments, XR device 200 may analyze whether one or more portions of the XR display should be dimmed in a field of view (FOV) of one or both eyes of a user a user. An FOV may be understood as a portion of an environment (real or virtual or any suitable combination thereof) that is generated for display, and/or captured, by an XR device 200 at a given time (e.g., an angle in a 360-degree sphere environment, or any suitable number of degrees). In some embodiments, the FOV may comprise a pair of 2D images to create a stereoscopic view in the case of a VR device; in the case of an AR device (e.g., smart glasses), the FOV may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any FOV may be defined by either the edge angular coordinates (e.g., +135 degrees, +225 degrees) or by a single angular coordinate (e.g., −55 degrees) combined with the known angular opening of the FOV. If an XR environment has six degrees of liberty, such as, for example, three rotations of 360 degrees and three spatial positions, any FOV may be defined by three angular coordinates and three spatial coordinates. The FOV may therefore be understood as a portion of an environment displayed when the user is at a particular location in the environment and has oriented the display device in a particular direction.

In some embodiments, control circuitry 208 of XR device 200 (and/or control circuitry 221 of server 224) may generate a data structure for a current FOV of the user, including object identifiers associated with (real and/or virtual) objects in an environment, and such data structure may include coordinates representing the position of the FOV and objects in the environment. The control circuitry may retrieve and utilize such data structure when determining which one or more portions of a display to be dimmed, e.g., determining to dim one or more portions corresponding to or in a vicinity of coordinates of a particular XR object.

In some embodiments, one or more portions of the XR display may be selectively dimmed based on user input (e.g., voice input, text-based, tactile based, a user interface selection, biometric input, or any other suitable input, or any combination thereof). For example, a user may be presented with a user interface comprising one or more options that enable a user to instruct that one or more portions of the XR display corresponding to the options should be dimmed, and/or enabling a user to touch portions of the displayed content to instruct dimming at such portions.

In some embodiments, one or more sensors may be used to track one or both eyes of a user, to determine a portion of XR display (e.g., within an FOV of the user) at which the user's gaze is directed or is focused and/or to determine gaze shifts and/or to determine change in eye position relative to the head. For example, based on determining that a user has gazed at a portion of the XR display (e.g., for at least a threshold period of time, as measured by a timer), the control circuitry may direct the performance of the techniques described herein to selectively dim portions of the XR display the user is gazing at. In some embodiments, image sensor 216 may be used to capture images of a user's eyes, and such images may be analyzed to track movement of a user's pupil and/or movement of other portions of a user's eye, to track the eyes of the user, and/or any other suitable technique may be used to track the user's eye (e.g., glint in the user's eyes). In some embodiments, IR source scanner 114, or IR source 112 (or any other suitable light source), may be used to selectively dim of portions of the XR display based on such eye tracking techniques.

In some embodiments, XR device 200 may comprise microphone 218, which may be configured to capture a voice command entered by a user, and control circuitry 208 of XR device 200 (and/or control circuitry 221 of server 224) may be configured to analyze and interpret such voice command and perform an action based on the voice command. For example, the control circuitry may determine that a voice command of "The bottom left of the screen is too bright" has been received, and may cause dimmable optical element 202 to dim such portion of the display based on the voice command. Alternatively, such voice command may be received via any other suitable input mechanism, e.g., text-based, tactile-based, a user interface selection, biometric input, or any other suitable input, or any combination thereof. In some embodiments, control circuitry 208 may receive, and implement, user preferences related to when dimming of portions of a display of XR device 200 should be performed.

In some embodiments, the control circuitry and/or I/O circuitry of XR device 200 and/or server 224 may be configured to cause speaker 232 to output audio as part of an XR media asset and/or associated with an XR object being generated for display. In some embodiments, such control circuitry and/or I/O circuitry may cause speaker 232 to output prompts or confirmatory messages to a user, e.g., "The top right corner of the screen seems pretty bright, would you like to dim this portion of the screen>," based on detecting that such portion of the screen should b dimmed using the techniques described herein, and performing an action in response to receiving confirmatory input from the user or automatically. Accelerometer 230 may be used to measure and track rotation and motion of a user (e.g., a rate of rotation around the XR device's x, y and z axes) and/or an orientation of direction of XR device 200. Depth sensor 234 may be configured to measure distance between XR device 200 and various objects in an environment surrounding XR device 200.

FIGS. 3A-3C show various configurations various configurations of an IR source and a dimmable optical element, in accordance with some embodiments of this disclosure. The IR source and dimmable optical element may be arranged at any suitable position in relation to each other in XR device 200. In some embodiments, as shown in FIG. 3A, IR source 312 (e.g., an IR laser unit) may be attached or coupled to tintable optical element 302, and activating light (e.g., IR light) may travel through dimmable optical element 302. In some embodiments, as shown in FIG. 3B, IR source 312 (e.g., an IR laser unit) may be implemented as a standalone element to provide flood exposure of IR on the entirety of dimmable optical element 302. In some embodiments, as shown in FIG. 3C, IR source scanner 314, which may comprise IR source 312 coupled to a scanner (e.g., a micro-electromechanical systems (MEMS), digital micro-mirror device (DMD) or any other suitable device, or any combination thereof), may be implemented as a stand-alone element to enable tinting of specific positions and/or pixels of a display of XR device 200.

FIGS. 4A-4G show illustrative arrangements for components of an XR device, in accordance with some embodiments of this disclosure. In some embodiments, any suitable combination of the arrangements of FIGS. 4A-4G may be employed, with any suitable number of each component, e.g., diffractive gratings, dimmable optical elements, and/or any other suitable component, disposed at any suitable position.

As shown in FIG. 4A, a freeform prism configuration may be employed in which a portion of dimmable optical element 402 (which may correspond to dimmable optical element 102 of FIGS. 1A-1C) may be disposed between display 404 of the XR device (e.g., XR device 200 of FIG. 2A) and combiner 405 (which may correspond to combiner 205 of FIG. 2B). An image beam provided by display 404 may be propagated through dimmable optical element 402 to combiner 405, and reflected through combiner 405 through a surface of combiner 405 to a user. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

In the example of FIG. 4A, a first portion of dimmable optical element 402 interfaces with an image beam provided via display 404, and a second portion of dimmable optical element 402 interfaces with light provided via physical environment 400. For example, when the XR device is an AR device, an XR object (or other content) may be provided via display 404 and overlaid on physical environment 400 (e.g., as seen via see-through AR glasses or captured by a camera of an AR device). Dimmable optical element 402 may be configured to dim one or more portions of an image beam provided via display 404, and/or dim light of external light provided via physical environment 400. For example, selective portions of dimmable optical element 402 may be activated that correspond to desired portions of the image and/or display that is determined to be dimmed. For example, the control circuitry may determine that light arriving at a specific portion of dimmable optical element 402 and/or at a specific portion of combiner 405 corresponds to a particular portion of an image provided to a user, and when such particular portion is determined to be dimmed, may activate portions of dimmable optical element 402 that correspond to such particular portion to be dimmed. In some embodiments, dimmable optical element 402 may be positioned so as to interact only with light from the physical environment (and/or an IR source), or to interact only with light projected from display 404.

As shown in FIG. 4B, a beam splitter cube configuration may be employed in which dimmable optical element 402 is disposed between physical environment 400 and combiner 405. An image beam provided by display 404 may be propagated through combiner 405 and through a surface of combiner 405 to a user. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

As shown in FIG. 4C, image source 404 may provide an image beam that travels through collimation lens 406 and into combiner or waveguide 405. Input grating 408 and output grating 410 may be surface relief diffraction gratings disposed on a surface of combiner or waveguide 405. Dimmable optical element 402 may be disposed between physical environment 400 and output grating 410. Diffractive gratings 408 and 410 may be configured to diffract light from physical environment 400 and/or image source 404. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user. In some embodiments, combiner or waveguide 405 may additionally, or alternatively, employ volume Bragg diffraction gratings and/or buried diffractive gratings.

As shown in FIG. 4D, a geometrical light-guide arrangement may be employed in which image source 404 may provide an image beam that propagates through combiner or waveguide 405, which may comprise diffractive gratings 412, 414 and 416. Diffractive gratings 412, 414 and 416 may be configured to diffract light from physical environment 400 and/or image source 404. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

Figure 4E:
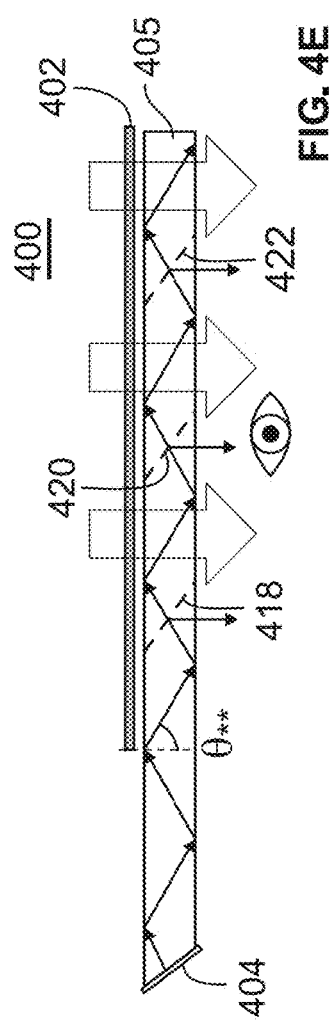

As shown in FIG. 4E, a pin-mirror arrangement may be employed in which image source 404 may provide an image beam that propagates through combiner or waveguide 405, which may comprise diffractive gratings 418, 420 and 422. Diffractive gratings 418, 420 and 422 may be configured to diffract light from physical environment 400 and/or image source 404. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

Figure 4F:
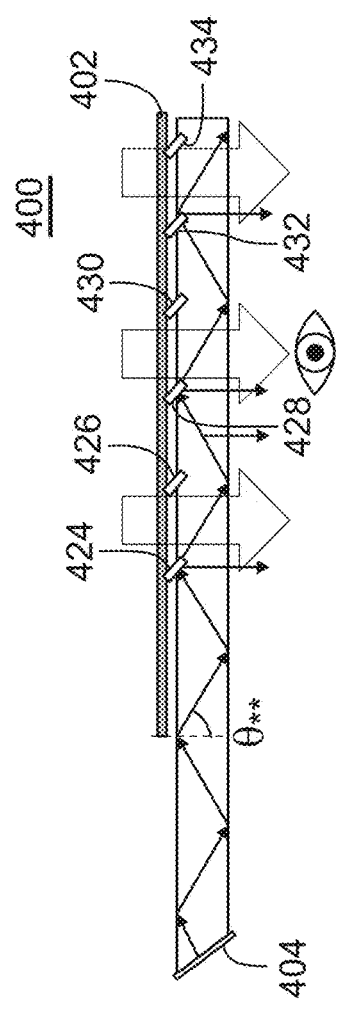

As shown in FIG. 4F, a microprism arrangement may be employed in which source 404 may provide an image beam that propagates through combiner or waveguide 405, which may comprise diffractive gratings 426, 428, 430, 432 and 434, which may be configured to diffract light from physical environment 400 and/or image source 404. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

Figure 4G:
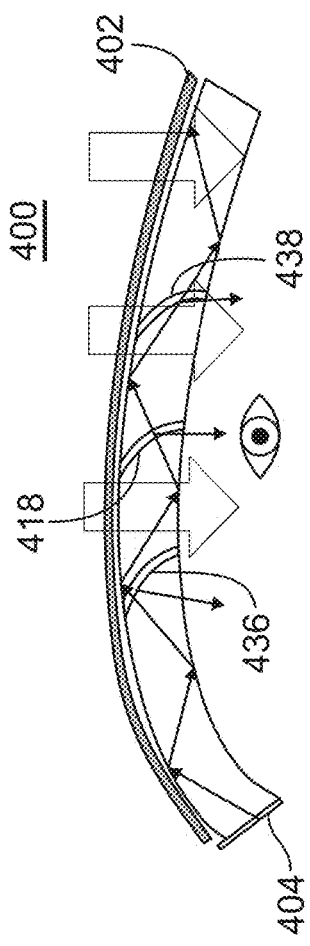

As shown in FIG. 4G, a curved lightguide architecture may be employed in which source 404 may provide an image beam that propagates through combiner or waveguide 405, which may comprise diffractive gratings 436 and 438, which may be configured to diffract light from physical environment 400 and/or image source 404. Dimmable optical element 402 may be irradiated with an IR light (e.g., from IR source 112 of FIG. 1B or from sunlight in physical environment 400), to cause emission of ultraviolet fluorescent light, to activate a color change in photochromic material of dimmable optical element 402, which in turn may cause dimming of one or more portions of the display and/or the image to be displayed to the user.

FIGS. 5A-5D show illustrative arrangements for components of an XR device, in accordance with some embodiments of this disclosure. In some embodiments, any suitable combination of the arrangements of FIGS. 5A-5D may be employed, with any suitable number of each component disposed at any suitable position.

Figure 5A:
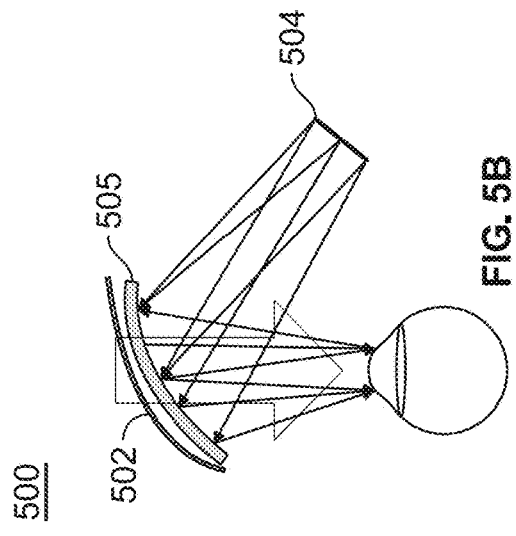
FIGS. 5A-5D show illustrative arrangements for components of an XR device, in accordance with some embodiments of this disclosure.

As shown in FIG. 5A, a reflective free-space coupler, e.g., a flat reflective coupler 505, may be employed and disposed between dimmable optical element 502 (which may correspond to dimmable optical element 102 of FIGS. 1A-1C) and physical environment 500 surrounding the XR device (e.g., XR device 200 of FIG. 2A). An image beam provided by display 504 may be propagated through collimation lens 506 and reflected off coupler 505, towards one or both eyes of the user. Dimmable optical element 502, which may be flat, may be irradiated with an IR light (e.g., from IR source 112 of FIG. 1B or from sunlight in physical environment 500), to cause emission of ultraviolet fluorescent light, to activate a color change in photochromic material of dimmable optical element 502, which in turn may cause dimming of one or more portions of the display and/or the image to be displayed to the user. In some embodiments, each of dimmable optical element 502 and coupler 505 may be arranged at a particular angle relative to physical environment 500.

Figure 5B:
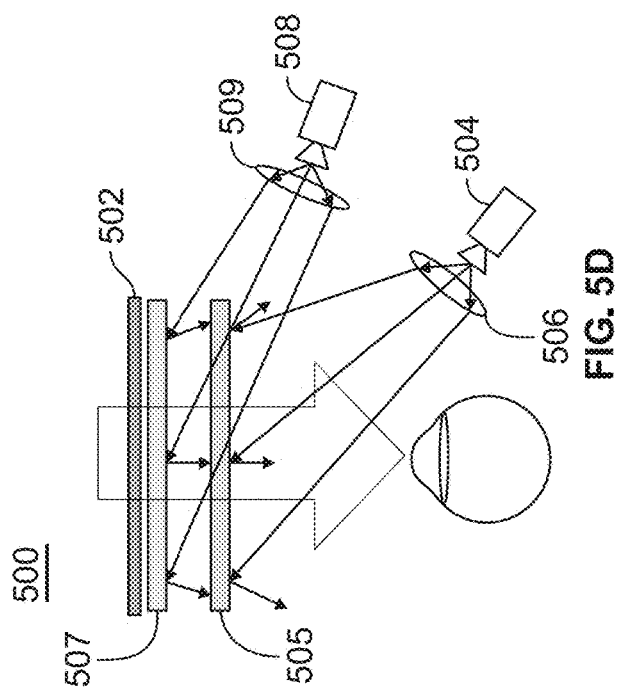

As shown in FIG. 5B, a reflective free-space coupler, e.g., a curved reflective coupler 505, may be employed and disposed between dimmable optical element 502 and physical environment 500 surrounding the XR device. An image beam provided by display 504 may be propagated and reflected off coupler 505, towards one or both eyes of the user. Dimmable optical element 502, which may be curved, may be irradiated with an IR light (e.g., from IR source 112 of FIG. 1B or from sunlight in physical environment 500), to cause emission of ultraviolet fluorescent light, to activate a color change in photochromic material of dimmable optical element 502, which in turn may cause dimming of one or more portions of the display and/or the image to be displayed to the user. In some embodiments, each of dimmable optical element 502 and coupler 505 may be arranged at a particular angle relative to physical environment 500.

Figure 5C:
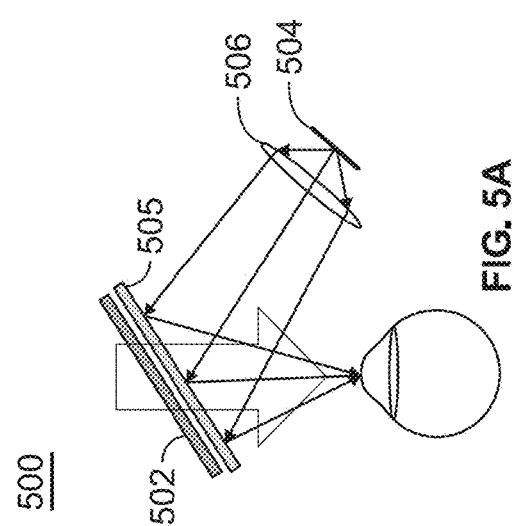

As shown in FIG. 5C, a reflective free-space coupler, e.g., a single diffusive coupler 505, may be employed and disposed between dimmable optical element 502 and physical environment 500 surrounding the XR device. An image beam provided by image source 504 may be propagated through collimation lens 506 and reflected off coupler 505, towards one or both eyes of the user. Dimmable optical element 502 may be irradiated with an IR light (e.g., from IR source 112 of FIG. 1B or from sunlight in physical environment 500), to cause emission of ultraviolet fluorescent light, to activate a color change in photochromic material of dimmable optical element 502, which in turn may cause dimming of one or more portions of the display and/or the image to be displayed to the user. In some embodiments, each of dimmable optical element 502 and coupler 505 may be arranged orthogonally relative to, or at any other suitable angle relative to, physical environment 500.

Figure 5D:
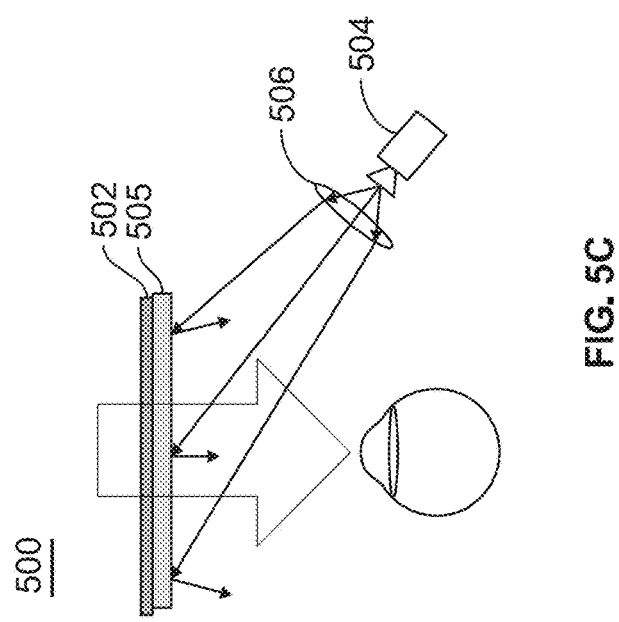

As shown in FIG. 5D, reflective free-space couplers, e.g., multi-diffusive couplers 505 and 507, may be employed and disposed between dimmable optical element 502 and physical environment 500 surrounding the XR device. An image beam provided by image source 504 may be propagated through collimation lens 506 and reflected off coupler 505, towards one or both eyes of the user. In addition, an image beam provided by image source 508 may be propagated through collimation lens 509 and reflected off coupler 507, towards one or both eyes of the user. Dimmable optical element 502 may be irradiated with an IR light (e.g., from IR source 112 of FIG. 1B or from sunlight in physical environment 500), to cause emission of ultraviolet fluorescent light, to activate a color change in photochromic material of dimmable optical element 502, which in turn may cause dimming of one or more portions of the display and/or the image to be displayed to the user. In some embodiments, each of dimmable optical element 502 and coupler 505 may be arranged orthogonally relative to, or at any other suitable angle relative to, physical environment 500.

FIGS. 6A-6D show illustrative arrangements for components of an XR device, in accordance with some embodiments of this disclosure. In some embodiments, any suitable combination of the arrangements of FIGS. 6A-6D may be employed, with any suitable number of each component disposed at any suitable position.

As shown in FIG. 6A, a diffractive free-space coupler, e.g., a flat diffractive coupler 605 may be employed (e.g., in a Maxwellian system) and disposed between dimmable optical element 602 (which may correspond to dimmable optical element 102 of FIGS. 1A-1C) and physical environment 600 surrounding the XR device (e.g., XR device 200 of FIG. 2A). An image beam provided by display 604 may be propagated through collimation lens 606 and directed by coupler 605, towards one or both eyes of the user. Dimmable optical element 602 may be irradiated with an IR light (e.g., from IR source 112 of FIG. 1B or from sunlight in physical environment 600), to cause emission of ultraviolet fluorescent light, to activate a color change in photochromic material of dimmable optical element 602, which in turn may cause dimming of one or more portions of the display and/or the image to be displayed to the user. In some embodiments, each of dimmable optical element 602 and coupler 605 may be arranged orthogonally relative to, or at any other suitable angle relative to, physical environment 600.

As shown in FIG. 6B, a diffractive free-space coupler, e.g., a diffractive lens coupler 605, may be employed and disposed between dimmable optical element 602 and physical environment 600 surrounding the XR device. An image beam provided by a display or light source 604 may be propagated through collimation lens 606 and spatial light modulator (SLM) 607, and directed by coupler 605, towards one or both eyes of the user. Dimmable optical element 602, which may be curved, may be irradiated with an IR light (e.g., from IR source 112 of FIG. 1B or from sunlight in physical environment 600), to cause emission of ultraviolet fluorescent light, to activate a color change in photochromic material of dimmable optical element 602, which in turn may cause dimming of one or more portions of the display and/or the image to be displayed to the user. In some embodiments, each of dimmable optical element 602 and coupler 605 may be arranged orthogonally relative to, or at any other suitable angle relative to, physical environment 600.

As shown in FIG. 6C, a diffractive free-space coupler, e.g., a single diffusive coupler 605, may be employed and disposed between dimmable optical element 602 and physical environment 600 surrounding the XR device. An image beam provided by image source 604 (e.g., employing laser beam scanning) may be propagated to and directed by coupler 605, towards one or both eyes of the user. Dimmable optical element 602 may be irradiated with an IR light (e.g., from IR source 112 of FIG. 1B or from sunlight in physical environment 600), to cause emission of ultraviolet fluorescent light, to activate a color change in photochromic material of dimmable optical element 602, which in turn may cause dimming of one or more portions of the display and/or the image to be displayed to the user. In some embodiments, each of dimmable optical element 602 and coupler 605 may be arranged orthogonally relative to, or at any other suitable angle relative to, physical environment 600.

As shown in FIG. 6D, diffractive micro-lens array (MLA) coupler 605 may be employed (e.g., in an integral imaging system) and disposed between dimmable optical element 602 and physical environment 600 surrounding the XR device. An image beam provided by display 604 may be propagated through collimation lens 606 and directed by coupler 605, towards one or both eyes of the user. Dimmable optical element 602, which may be curved, may be irradiated with an IR light (e.g., from IR source 112 of FIG. 1B or from sunlight in physical environment 600), to cause emission of ultraviolet fluorescent light, to activate a color change in photochromic material of dimmable optical element 602, which in turn may cause dimming of one or more portions of the display and/or the image to be displayed to the user. In some embodiments, each of dimmable optical element 602 and coupler 605 may be arranged orthogonally relative to, or at any other suitable angle relative to, physical environment 600.

In some embodiments, dimmable optical element 102 (which may correspond to element 202, 302, 402, 502 and 602) may be positioned or buried inside XR device 202 so as to shield dimmable optical element 102 from the external environment, e.g., via glass (and/or any other suitable UV blocking material or substrate), which blocks a relatively large portion of UV light, to avoid external light (e.g., sunlight) from tinting the entire dimmable optical element 102, unless that is determined to be desirable. Such features may help enable selective adjustment of pixels or portions of the display and/or displayed image to perform dimming.

Figure 7:
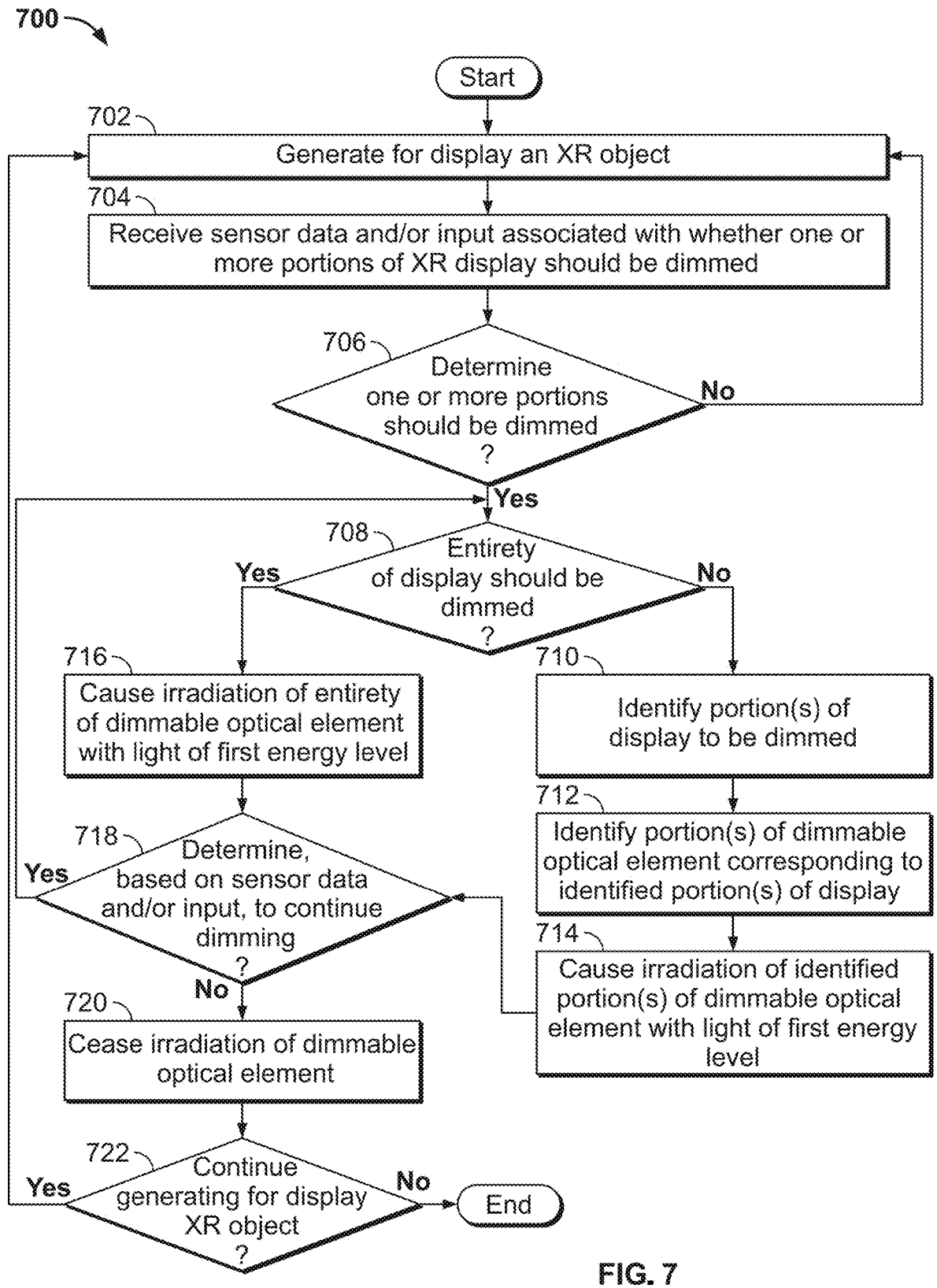
FIG. 7 is a flowchart of a detailed illustrative process for dimming at least a portion of a display of an extended reality (XR) device, in accordance with some embodiments of this disclosure.

FIG. 7 is a flowchart of a detailed illustrative process for dimming at least a portion of a display of an extended reality (XR) device, in accordance with some embodiments of this disclosure. In various embodiments, the individual steps of process 700 may be implemented by one or more components of the computing devices and systems of FIGS. 1-6 and may be performed in combination with any of the other processes and aspects described herein. Although the present disclosure may describe certain steps of process 700 (and of other processes described herein) as being implemented by certain components of the computing devices and systems of FIGS. 1-6, this is for purposes of illustration only. It should be understood that other components of the computing devices and systems of FIGS. 1-6 may implement those steps instead.

At 702, control circuitry (e.g., circuitry 208 of XR device 200, and/or control circuitry 221 of server 224, of FIG. 2A) may generate for display, at a display of XR device 200 (e.g., display 404 of FIGS. 4A-4G, which may be projected to one or both eyes of a user via combiner 405), an XR object. For example, such XR object may be an AR object (e.g., a digital representation of a person, an animal, an item or any other suitable object or entity) overlaid on a real-world scene, e.g., via AR glasses, or a VR object, e.g., part of a partial or full virtual world in which the user may be immersed. In some embodiments, the XR object may be generated for display in response to a request from a user operating the XR object, or automatically (e.g., as part of a movie, television show, live event, video game or other digital asset being provided via the XR device). Any suitable number of XR objects may be generated for display simultaneously by the control circuitry.

At 704, the control circuitry may receive sensor data and/or input associated with whether one or more portions of the XR display should be dimmed. For example, the XR device (e.g., XR device 200) may comprise an image sensor (e.g., image sensor 216 of FIG. 2A) configured to capture one or more images of content currently being generated for display to a user of the XR device, and the control circuitry may receive (e.g., via I/O circuitry 212) such image(s). As another example, the control circuitry may receive sensor data from a brightness or illuminance sensor (e.g., illuminance sensor 222 of FIG. 2A) in relation to content currently being generated for display to a user of the XR device. In some embodiments, the control circuitry may receive input (e.g., via a voice command, text-based command, tactile-based command, user interface selection, biometric input, or any other suitable input, or any combination thereof) indicating a user's desire to dim one or more portions of the XR device's display. For example, the control circuitry may receive (e.g., via I/O circuitry 212, as detected by microphone 218) "The bottom left of the screen is too bright" or "Can you dim the area around the virtual object?" or "The whole screen is too bright?" or "Can you dim the area near the lake?", e.g., if the XR environment is depicting a lake.

In some embodiments, 704 may be performed prior to generating for display the XR object at 702. For example, before a user selects an option to request the XR object to be generated for display, or selects an option to request to access a media asset in which the XR object is to be generated for display, the control circuitry may analyze ambient conditions surrounding the XR device and anticipate that one or more portions of the display should be dimmed to provide an adequate contrast for the user's eyes.

At 706, the control circuitry may determine whether one or more portions of the XR display should be dimmed. For example, the control circuitry may be configured to analyze the image(s) captured by the image sensor (e.g., image sensor 216 of FIG. 2A) to determine one or more portions of the display (e.g., associated with pixel values above a threshold) that are exhibiting relatively high brightness (e.g., as a result of unwanted effects from ambient light surrounding the XR device) and thus should be dimmed. Additionally, or alternatively, the control circuitry may be configured to analyze sensor data from a brightness or illuminance sensor 222, indicating that a particular portion of the XR display is exhibiting relatively high brightness (e.g., above a threshold, as a result of unwanted effects from ambient light surrounding the XR device) and thus should be dimmed. In some embodiments, the control circuitry may compare detected brightness values to expected brightness values (e.g., indicated in metadata for a particular media asset associated with the XR object), to determine whether the detected brightness values are within an acceptable range of the expected values.

Additionally, or alternatively, the control circuitry may determine that input received from a user indicates a desire to dim one or more portions of the XR display. In some embodiments, the control circuitry may determine (e.g., based on a GPS signal from GPS module 236 of FIG. 2A or other positional sensor) that a user is currently outside (or inside a building), and/or that a current location of the user is at a particular geographic region that is experiencing a certain type of weather (e.g., sunny or overcast), and may determine whether one or more portions of the XR display should be dimmed based on this information.

If the control circuitry determines that one or more portions of the XR display should be dimmed, processing may proceed to 708. Otherwise, if control circuitry determines that there are not any portions of the display should be dimmed (e.g., if brightness levels of pixels associated with content being displayed are determined to be below a threshold, no input is received from the user, and/or a current location of the user is determined to be in a relatively dark environment) processing may return to 702.

At 708, the control circuitry may determine whether an entirety of the XR display should be dimmed. For example, based on the processing performed at 706, the control circuitry may determine whether all of the display is experiencing relatively high brightness, and/or whether a threshold amount of the display (e.g., 90%) is experiencing relatively high brightness, in which case it may be considered that the whole display is experiencing relatively high brightness. If so, processing may proceed to 716; otherwise processing may proceed to 710. In some embodiments, steps 706 and 708 can be considered as part of the same step.

At 710, the control circuitry may determine whether one or more portions of the XR display should be dimmed. For example, based on the processing performed at 706, the control circuitry may identify a subset of portions from among all of the portions of the display that are associated with a brightness value above a particular threshold, and/or one or more portions specified by user input as portions that should be dimmed.

At 712, the control circuitry may identify portion(s) of dimmable optical element (e.g., element 102 of FIGS. 1A-1C) corresponding to the portion(s) of the XR display identified at 710 that should be dimmed. For example, in the example of FIG. 4B, sunlight from physical environment 400 may be traveling through dimmable optical element 402 and causing excessive brightness at a particular portion of the image being provided to the user (via display 404 and combiner 405). The control circuitry may identify a particular portion or region of dimmable optical element 402 that corresponds to the particular portion of the image being provided to the user experiencing excessive brightness. For example, a correspondence between specific portions of dimmable optical element 402 and a displayed image (e.g., a portion of element 402 through which light travels to a specific portion of the displayed image) may be computed for a particular arrangement of a display, combiner and dimmable optical element (e.g., shown in FIGS. 4-6), and such correspondence may be stored in memory and referenced by the control circuitry, to determine which portion(s) of the dimmable optical element should be irradiated (at 714) to cause dimming of images being generated for display. For example, the control circuitry may determine that light emitted from a particular LED(s) of display 404 corresponds to a particular portion of the image displayed to the user, and may reference a mapping of coordinates of a particular XR object being displayed to a particular portion of the dimmable optical element.

At 714, the control circuitry may cause irradiation of identified portion(s) of dimmable optical element (e.g., element 102 of FIGS. 1A-1C) with light of the first energy level (e.g., IR light via IR laser 108 of FIG. 1A). Additionally, or alternatively, such light of the first energy level may be received via sunlight from an environment external to XR device (e.g., XR device 100 of FIGS. 1A-1C). Such light of the first energy level may cause a plurality of up-converting nanoparticles (e.g., UCNPs 104 of FIGS. 1A-1C) of the dimmable optical element (e.g., element 102 of FIGS. 1A-1C) to absorb multiple photons of the relatively lower first energy level, and based on such absorption, to convert and emit photon(s) of a relatively higher second energy level (e.g., fluorescent UV light 110 of FIG. 1A) towards photochromic material (e.g., photochromic material 106 of FIG. 1A). In some embodiments, such photochromic materials may be present in a coating or matrix associated with the dimmable optical element. Such UV light may activate the photochromic material of the dimmable optical element, thereby causing external light that has been striking the dimmable optical element (and having been previously causing excessive brightness in portions of the content being provided via the XR device) to be tinted, dimmed or darkened. Such dimming, tinting or darkening of the external light may cause a change in color of the at least a portion of the display, e.g., effectively tinting the display in the desired pixel/area, to reduce or eliminate the excessive brightness being experienced by the user at the identified portion(s) of the XR display by stopping or hindering the external light from interfering with portions of the projected image. In some embodiments, IR source scanner 114 of FIG. 1C and/or IR source scanner 314 of FIG. 3C may be employed at 714.

At 716, the control circuitry, having determined at 708 that an entirety of the XR display should be dimmed, may cause irradiation of the entirety of the dimmable optical element with the light of the first energy level (e.g., IR light). In some embodiments, IR source scanner 114 of FIG. 1B and/or IR source scanner 314 of FIG. 3C may be employed at 716. The technique performed at 716 may cause an entirety (or substantially an entirety of), or otherwise a significant portion of, the XR display to be tinted, dimmed or darkened, by irradiating a plurality of up-converting nanoparticles (e.g., UCNPs 104 of FIGS. 1A-1C) of the dimmable optical element (e.g., element 102 of FIGS. 1A-1C) with multiple photons of the relatively lower first energy level, which converts and emits photon(s) of a relatively higher second energy level (e.g., fluorescent UV light 110 of FIG. 1A) towards photochromic material (e.g., photochromic material 106 of FIGS. 1A-1C). Such UV light may activate the entirety of, or otherwise a significant portion or substantially an entirety of, of the photochromic material of the dimmable optical element, thereby causing external light that has been striking the dimmable optical element (and having been previously causing excessive brightness in the entirety of, or otherwise a significant portion of or substantially an entirety of, the XR display) to be tinted, dimmed or darkened. Such dimming, tinting or darkening of the external light may cause a change in color of the entirety of or a significant portion of the XR display, by stopping or hindering the external light from interfering with the projected image.

In some embodiments, 710 and 716 may correspond to causing one or more pixels or portions associated with the display to be totally opaque, unless a particular XR object is determined to be intended to be transparent, in which case pixels or portions corresponding to such XR object may not be modified. In some embodiments, a brightness level of a region that is to be tinted may be commensurate with an intensity of the IR light with which the dimmable optical element is irradiated, e.g., if an area or pixel(s) is displaying a particularly high brightness, the intensity of the IR light may be increased to apply a more significant dimming of such portion.

At 718, the control circuitry, having locally or wholly dimmed one or more portions of the XR display, may determine, based on sensor data and/or input, whether to continue performing the dimming (and/or whether to adjust a level of dimming). In some embodiments, sensor data and/or inputs similar to those received at 704 may be analyzed by the control circuitry. For example, if an ambient light sensor (e.g., ambient light sensor 220 of FIG. 2A) indicates that user is no longer in a sunny environment or has gone inside a building or house, or an input of "stop performing dimming" is received, processing may proceed to 720. On the other hand, if the inputs and/or sensor data indicate that dimming should continue to be performed (whether at the same level or a reduced or increased level), processing may return to 708 and/or such dimming (or adjusted dimming) may continue to be performed.

At 722, the control circuitry, having determined to cease irradiation of the dimmable optical element and thus ceasing performing dimming, may determine whether to continue generating for display the XR object. For example, if input from a user has been received to cease generating for display the XR object, or the XR device is turned off, processing may end. Otherwise, processing may return to 702, to determine whether one or more portions of the XR display should be dimmed.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. An extended-reality (XR) device, comprising:
a display;
control circuitry configured to generate for display, by the display, an XR object; and
a dimmable optical element, wherein:
the dimmable optical element comprises a plurality of upconverting nanoparticles and a photochromic material, and is configured to cause a change in color of at least a portion of the display;
the control circuitry is configured to cause the dimmable optical element to be irradiated with light of a first energy level which causes the plurality of upconverting nanoparticles to emit light of a second energy level higher than the first energy level; and
the photochromic material absorbs the light of the second energy level to cause the change in color of the at least a portion of the display.

2. The XR device of claim 1, wherein the light of the first energy level is infrared light, and the light of the second energy level is ultraviolet fluorescent light.

3. The XR device of claim 2, wherein the infrared light is received from a source that is external to the XR device.

4. The XR device of claim 2, further comprising:
an infrared light source; and
wherein the control circuitry is further configured to:
determine that the at least a portion of the display should be dimmed, based on comparing a current brightness value of the at least a portion of the display to a threshold value; and
in response to determining that the at least a portion of the display should be dimmed, controlling the infrared light source to irradiate the dimmable optical element with the infrared light.

5. The XR device of claim 4, wherein:
the at least a portion of the display corresponds to substantially an entirety of the display; and
the control circuitry is further configured to cause the infrared light source to irradiate the entirety of the display with the infrared light.

6. The XR device of claim 4, wherein:
the XR device further comprises a scanner that is coupled to the infrared light source to form an infrared light scanner;
the display comprises a plurality of portions, and the at least a portion of the display corresponds to a subset of the plurality of portions of the display; and
the control circuitry is further configured to cause the infrared light scanner to irradiate the subset of the plurality of portions of the display.

7. The XR device of claim 6, wherein the control circuitry is configured to:
track eye movement of one or both eyes of a user associated with the XR display; and
cause the infrared light scanner to irradiate the subset of the plurality of portions of the display based at least in part on the tracked eye movement.

8. The XR device of claim 1, wherein the XR device further comprises an image sensor configured to capture an image of the display, and the control circuitry is configured to determine that at least a portion of the display should be dimmed by:

analyzing the image to determine a current brightness value of the at least a portion of the display;
comparing the brightness value to a threshold value; and
based on the comparison, determining that the at least a portion of the display should be dimmed.

9. The XR device of claim 1, wherein:
the XR device is an augmented reality (AR) device;
the XR object is an AR object overlaid on a real-world scene; and
the at least a portion of the display corresponds to a portion of the real-world scene.

10. The XR device of claim 1, wherein the photochromic material corresponds to a photochromic dye.

11. The XR device of claim 1, wherein the dimmable optical element is disposed internal to the XR device, and the XR device comprises glass that blocks at least a portion of ultraviolet light from an environment external to the XR device from reaching the dimmable optical element.

12. A method comprising:
generating for display, by a display of an extended-reality (XR) device, an XR object, wherein the XR device comprises a dimmable optical element comprising a plurality of upconverting nanoparticles and a photochromic material; and
causing, by the dimmable optical element, a change in color of at least a portion of the display by:
causing the dimmable optical element to be irradiated with light of a first energy level which causes the plurality of upconverting nanoparticles to emit light of a second energy level higher than the first energy level, wherein the photochromic material absorbs the light of the second energy level to cause the change in color of the at least a portion of the display.

13. The method of claim 12, wherein the light of the first energy level is infrared light, and the light of the second energy level is ultraviolet fluorescent light.

14. The method of claim 13, wherein the infrared light is received from a source that is external to the XR device.

15. The method of claim 13, further comprising:
determining that the at least a portion of the display should be dimmed, based on comparing a current brightness value of the at least a portion of the display to a threshold value; and
in response to determining that the at least a portion of the display should be dimmed, causing the at least a portion of the display to be dimmed by causing an infrared light source of the XR device to irradiate the dimmable optical element with the infrared light.

16. The method of claim 15, wherein:
the at least a portion of the display corresponds to an entirety of the display; and
the method further comprises causing the infrared light source to irradiate the entirety of the display with the infrared light.

17. The method of claim 15, wherein:
the XR device further comprises a scanner that is coupled to the infrared light source to form an infrared light scanner;
the display comprises a plurality of portions, and the at least a portion of the display corresponds to a subset of the plurality of portions of the display; and
the method further comprises causing the infrared light scanner to irradiate the subset of the plurality of portions of the display.

18. The method of claim 17, further comprising:
tracking eye movement of one or both eyes of a user associated with the XR display; and
causing the infrared light scanner to irradiate the subset of the plurality of portions of the display based at least in part on tracking the eye movement of the user.

19. The method of claim 12, wherein the XR device further comprises an image sensor configured to capture an image of the display, and the method further comprises:
determining that at least a portion of the display should be dimmed by:
analyzing the image to determine a current brightness value of the at least a portion of the display;
comparing the brightness value to a threshold value; and
based on the comparison, determining that at the least a portion of the display should be dimmed.

20. The method of claim 12, wherein:
the XR device is an augmented reality (AR) device;
the XR object is an AR object overlaid on a real-world scene; and
the at least a portion of the display corresponds to a portion of the real-world scene.

21. The method of claim 12, wherein the photochromic material corresponds to a photochromic dye.

22. The method of claim 12, wherein the dimmable optical element is disposed internal to the XR device, and the XR device comprises a substrate that blocks at least a portion of ultraviolet light from an environment external to the XR device from reaching the dimmable optical element.

* * * * *